March 4, 1930. E. GALATI 1,749,025
PIECED CLOTH FORMATION
Filed Oct. 14, 1927
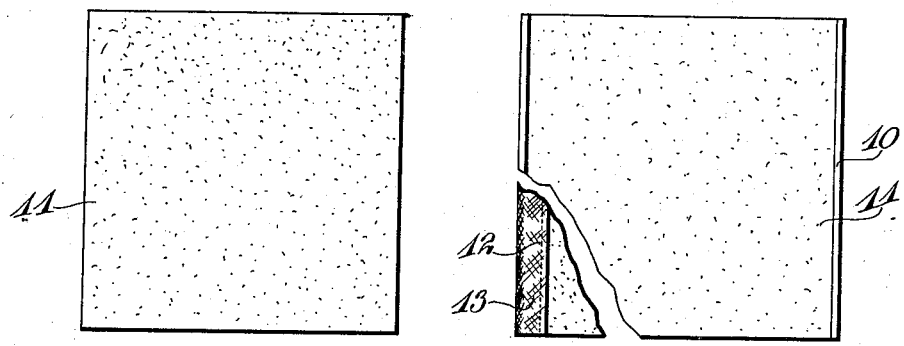
Fig. 1.  Fig. 2.
Fig. 3.
 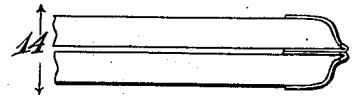
Fig. 4.  Fig. 5.
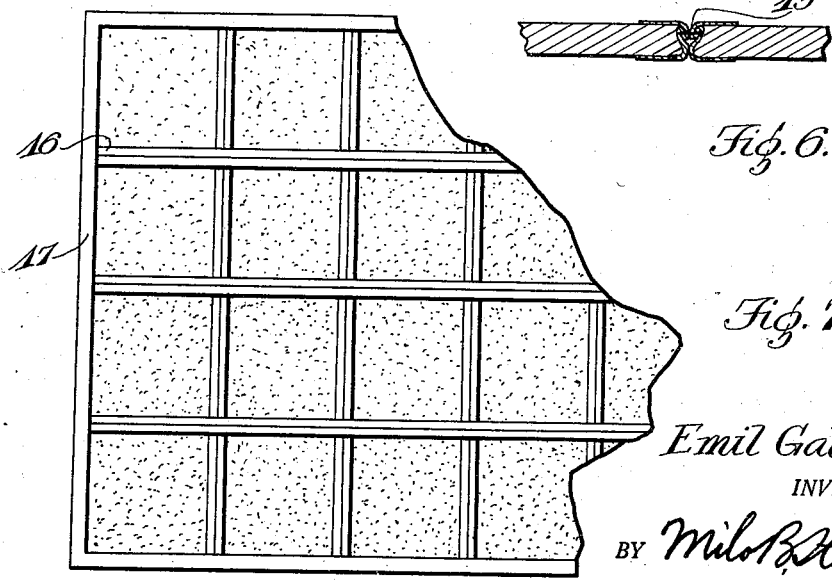
Fig. 6.
Fig. 7.
Emil Galati
INVENTOR.
BY
ATTORNEYS.

Patented Mar. 4, 1930

1,749,025

UNITED STATES PATENT OFFICE

EMIL GALATI, OF CHICAGO, ILLINOIS

PIECED-CLOTH FORMATION

Application filed October 14, 1927. Serial No. 226,188.

My invention relates to the art of conserving cloth which is in the form of remnants and usually discarded as waste, and it is my main object to provide a novel method of joining the remnants or pieces whereby a useful sheet of cloth is formed.

A further object of my invention is to employ materials and machines of standard make for the purpose of uniting the pieces referred to.

A final, but nevertheless important object of my invention is to use a method of extreme simplicity to secure the desired results, and to produce a firm and durable connection.

With the above objects in view and any others that may suggest themselves from the specification and claims to follow, a better understanding of the invention may be gained by reference to the accompanying drawing, in which—

Figure 1 is a plan view of a typical remnant or piece of cloth commonly thrown into the discard, but employed to advantage in the use of my invention;

Fig. 2 is a similar view showing the first step in the preparation of the piece for the joining operation; a corner of the piece being shown magnified;

Fig. 3 is an edge view from the front or rear of the illustration of Figure 2, on a magnified scale;

Fig. 4 is an edge view of two cloth pieces arranged for the joining operation;

Fig. 5 is a view similar to Figure 4, showing the form assumed by the combination at the joining site;

Figure 6 is a section of two pieces joined and opened to assume a flat form; and Fig. 7 is a plan view, partly broken away, of a sheet of pieced material.

It is a familiar fact that in many tailoring shops much material is cut away and discarded as waste matter, when the cloth is cut into the desired patterns. The discarded pieces are remnants and are usually gathered into a basket or other receptacle and sold as waste to the mills, bringing a nominal return. It has occurred to me that much of this waste cloth, which is usually of good quality, may be recovered and formed into some suitable product, such as a blanket, automobile robe, or quilt. Accordingly, I cut the pieces to a suitable unit shape, such as squares, rectangles, or diamonds, before uniting them.

In the process of joining the remnant units, one of which I have shown as a matter of example in Figure 1, I first apply what is called a piping 10 along opposite edges of the piece or patch 11. As noted more clearly in Figure 3, this piping is a channel-shaped edging which surmounts the edge of the cloth and is stitched firmly thereto along the line 12. The affected edges of the piece 11 are thus bound in the channel-shaped piping, and the latter is cut with its weave on a bias, as indicated at 13 in Figure 2, for a purpose soon to be made clear. When two pieces have been prepared as described, they are assembled in stacked formation, one one thereof being illustrated in Figure 4. It will here be seen that the reinforced edges of the respective pieces are in superimposed relation. The doubled edge is now run through another sewing machine which is gauged to join but the crowns of the piping, so that the stitched combination will assume the form illustrated in Figure 5. The biased weave of the piping will permit the same to stretch sufficiently, when engaged by the needle, to keep the stitch free of the goods inside the piping, so that the piping will be joined compactly and neatly. The respective pieces are now swung out from each other in the directions of the arrows 14 in Figure 5, so that when opened out to fully extended position they will appear sectionally as in Figure 6. It will here be seen that but the piping has been affected by the last described stitching, showing a tucked effect, as indicated at 15. Otherwise, the pieces are extended as if in one flat sheet.

A number of pieces may be joined as described above in lateral succession, so as to form a ribbon with transverse piping lines to denote the units joined. When two such ribbons are edged with long pieces of piping as indicated at 16 in Figure 7, they may then be joined along such piping in the same manner as in the case of small pieces, so that ultimately a sheet of the units will result, the design being with squares as in Figure 7, or with any other unit forms or motif desired. Also, a suitable border or edging 17 may be made to lend the cloth sheet a finished appearance, and make the same useful as a blanket, automobile robe, or the like.

When it is considered that the remnants I intend to use may be from expensive overcoat or suit stock, it will be appreciated that the resulting articles formed by my method could be represented as being of fine quality, yet selling at a reasonable low figure because of the low cost of production. Obviously, with the material purchased at nominal cost, but the expenses of the piping and labor need be considered once the proper machines for stitching the piping have been installed. In conclusion, it may be said that my novel method recovers and puts into useful form much fall-off material which is now considered as waste and given a corresponding value. By my method, useful and durable articles of a protective nature may be formed, and the use of pieces or units of various colors facilitates the formation of fascinating or bizarre patterns, giving the goods a novel effect.

I claim:—

1. A pieced cloth formation comprising a channeled edging stitched on the contiguous edges of the pieces joined, and a stitched connection through the crowns of the said edgings in a plane parallel with and adjacent one surface of the joined pieces, said stitches lying entirely within the plane formed by said pieces.

2. The method of joining cloth pieces edgewise, comprising the mounting of the contiguous edges with channeled edging, the stitching of said edging to the corresponding pieces, the assembling of the latter in superimposed order and with the respective edgings in doubled relation, and the joining of the adjacent portions of the crowns of such edgings by stitching.

In testimony whereof I affix my signature.

EMIL GALATI.